United States Patent
Wohn-Machowski

[15] 3,663,037
[45] May 16, 1972

[54] OCCUPANT SAFETY RETAINING DEVICE FOR VEHICLES

[72] Inventor: Mary Wohn-Machowski, 841 Greendale Drive, Windsor, Ontario, Canada

[22] Filed: Jan. 6, 1971

[21] Appl. No.: 104,321

[52] U.S. Cl. .................................................. 280/150 B
[51] Int. Cl. ....................................................... B60r 21/04
[58] Field of Search ............................................ 280/150 B

[56] References Cited

UNITED STATES PATENTS 2,025,822   12/1935   Pryor .................................. 280/150 B
3,443,824   5/1969    Dietrich .............................. 280/150 B Primary Examiner—Kenneth H. Betts
Assistant Examiner—Robert R. Song
Attorney—Barthel & Bugbee

[57] ABSTRACT

Detachably connected to the conventional floor-anchored vehicle seat belt is an occupant-retaining device consisting of an inverted U-shaped occupant-retaining shield of flexible transparent material detachably securable at its forward end to the conventional seat belt, anchored at its uppermost portion to the vehicle roof structure, and secured at its rearward end to the upper ends of flexible straps, the lower ends of which are anchored to the vehicle chassis or floor structure. The device creates a flexible transparent-walled chamber wherein, during a collision, the forward portion of the shield retains the upper portion of the body of the occupant within the shield chamber and prevents it from being thrown through or against the windshield while the rearward portion of the shield prevents backlash, and both prevent the occupant's ejection from the chamber. When not in use, the forward end of the shield is detached from the seat belt and is secured to a convenient point on the vehicle body.

7 Claims, 3 Drawing Figures

PATENTED MAY 16 1972 3,663,037
FIG. 1
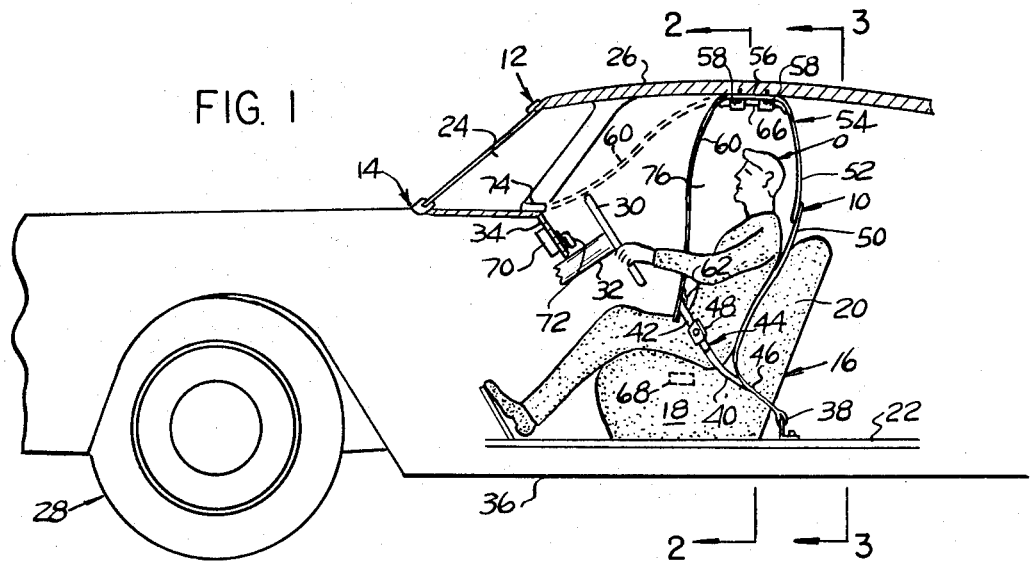
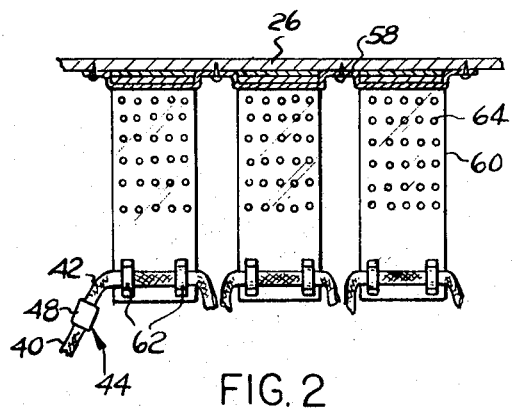
FIG. 2
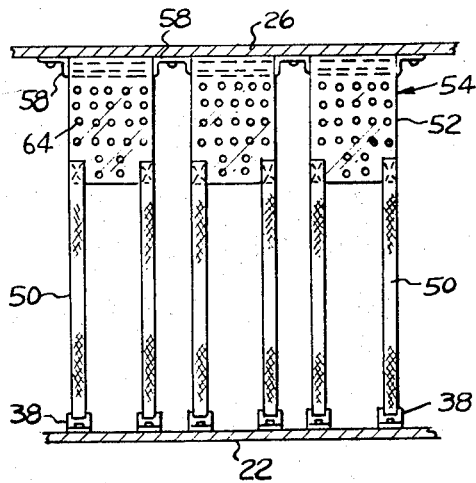
FIG. 3
INVENTOR
MARY WOHN-MACHOWSKI
BY Barthel & Bugbee
ATTORNEYS

OCCUPANT SAFETY RETAINING DEVICE FOR VEHICLES

BACKGROUND OF INVENTION

Heretofore, in a large portion of serious vehicle accidents the occupants have been seriously or fatally injured either by being thrown completely out of the vehicle body compartment or by being thrown against interior parts of the vehicle body. Even when a conventional seat belt has been used, the user has often been seriously injured by the pivoting of the upper portion of his body around the seat belt as a fulcrum so as to swing into contact with the steering wheel, windshield, dash, windshield header or other part of the vehicle body within the range of such swinging. The present invention provides a device which creates a safety zone or chamber within a transparent inverted U-shaped shield within which the user is retained in the event of a collision and is thereby prevented from sustaining serious injury.

In the drawing,

FIG. 1 is a diagrammatic side elevation, partly in section, through a conventional motor vehicle, particularly a passenger automobile, showing an occupant protected by the safety occupant-retaining device of the invention in its operative position, with its inoperative or storage position shown in dotted lines;

FIG. 2 is a vertical section, taken along the line 2—2 in FIG. 1, with the body of the occupant omitted to avoid obstructing the view of the device thereby; and FIG. 3 is a vertical section, taken along the line 3—3 in FIG. 1, with both the body of the occupant and the back of the seat omitted, likewise to avoid obstructing the view thereby.

Referring to the drawing in detail, FIG. 1 shows an occupant safety retaining device, generally designated 10, as mounted in the body 12 of a conventional motor vehicle, such as, for example, a passenger automobile, generally designated 14 and shown diagrammatically. The vehicle 14 is shown as provided with a seat 16 having a bottom 18 and a back 20 mounted on and supported by the floor structure 22 of the body 12. The body 12 is also shown as provided with a windshield 24 extending between a roof structure 26 and a motor-driven wheeled chassis, generally designated 28, equipped with a steering wheel 30 upon a steering post 32 which passes downward through the dash 34. Secured to the floor structure 22, which in a modern passenger automobile forms a portion of the chassis frame 36, are laterally spaced seat belt anchorages or lower anchorages 38 from which the portions 40 and 42 of the usual seat belts 44 pass upward through the passageway 46 between the back 20 and bottom 18 of the seat 16 and are detachably connected to one another by buckles 48. The above-described construction, apart from the device 10, is conventional and its details form no part of the present invention.

Also secured to the same or similar anchorages 38 are the lower ends of rearward straps or tension means 50, the upper ends of which are secured, as by stitching, riveting, or other suitable means, to the lower end of the rearward portion 52 of a transparent inverted-U-shaped occupant-retaining shield 54. The intermediate portion 56 of the shield 54 is bolted or otherwise firmly secured as by anchor brackets 58 constituting upper anchorage means secured to the roof structure 26 while the forward portion 60 extends downward to loops 62 secured thereto near the lower end thereof (FIG. 2), as by stitching. The inverted U-shaped transparent shield 54 is made from any suitable flexible transparent synthetic plastic material of sufficient strength such as, for example, flexible transparent vinyl plastic of three to four hundredths of an inch thickness meeting the specifications commonly known in the plastics industry by the designation MIL-P-18080. For ventilation, the forward and rearward portions 60 and 52 of the occupant-retaining member 54 are preferably provided with multiple holes 64 therethrough. The roof anchor brackets 58 are provided with safety padding 66. An optional feature additionally included in the invention is a safety pressure-responsive warning switch 68 (FIG. 1) located within the seat bottom 18 and constituting the control switch of an electrical warning buzzer circuit (not shown). The buzzer 70 of this warning circuit is located in any suitable position, such as against the dash 34, and connected in circuit with the vehicle ignition switch 72 and sounds an alarm warning when the ignition switch 72 is moved to its "on" position by an occupant O sitting on the seat bottom 18 and thereby actuating the pressure-responsive switch 68, before he has inserted the portion 42 of the seat belt 44 through the loops 62 in the forward portion 60 of the shield 54 and secured it to the buckle 48. The buzzer 70 will cease to sound its warning only when the safety shields 54 and seat belts 44 are locked in their operative positions, as shown in solid lines in FIG. 1.

In the use of the occupant safety retaining device 10, let it be assumed that the forward portion 60 of the shield 54 has been detached from the seat belt 44 and its loop 62 has been releasably secured to the holder or hook 74 attached to the roof structure 26 as shown by the dotted line position of the portion 60 in FIG. 1. When the operator O enters the vehicle 12 and sits upon the seat 16, he unhooks the loops 62 of the forward portion 60 of his shield 54, swings it downward into the solid line position shown in FIG. 1, passes the portion 42 of the seat belt 44 through the loops 62 and into the buckle 48, whereupon the device 10 is in its protective position shown in solid lines in FIG. 1. If, now, the occupant O turns on the ignition switch 72, the warning buzzer 70 does not sound. If, however, the operator turns on the ignition switch 72 before attaching the forward portion 60 of his shield 54 to his seat belt 44, the pressure responsive switch 68, actuated by his weight, completes the energization of the circuit of the buzzer 70 and causes the latter to sound its warning.

With the shield 54 thus placed in its protective position for each occupant of the vehicle, each such occupant is thereby positioned with the upper portion of his body within an inverted U-shaped chamber 76 within the safety shield 54. In the event of a collision whereby the forward motion of the vehicle 12 is suddenly halted, the upper portion of the occupant's body can swing only through the short distance between him and the forward portion 60 of the shield 54 and thus is retained within the shield chamber 76 and guarded against serious injury. If, on the other hand, the vehicle 12 is hit from behind by another vehicle, the occupant O is protected against so-called whiplash injury by the close proximity of the rearward portion 52 of the shield 54 to his head. Meanwhile, during normal driving, the driver or other occupant can see through the transparent forward and rearward portions 60 and 52 of the shield 54 while the chamber 76 is ventilated not only from the sides but also through the multiple holes 64 in the forward and rearward portions 60 and 52 of each shield 54.

At the conclusion of the drive, or at any intermediate halt, the occupant O desiring to leave the vehicle 12, unfastens the buckle 48 of his seat belt 44, withdraws the belt portion 42 through the shield loops 62, swings the forward shield portion 60 upward to the holder 74 and hooks it thereon, as by its loops 62. The forward portion 60 of the shield 54 is thus stored in its raised dotted line position without interfering with the occupant or occupants O from entering or leaving the vehicle.

I claim:

1. An occupant safety retaining device adapted to be installed in the passenger compartment of a motor vehicle having a roof structure, a floor structure with seat belt anchorages secured thereto, a seat with a bottom portion and a back portion, and a seat belt secured to said seat belt anchorages, said device comprising a vehicle occupant shield of flexible transparent sheet material having an intermediate portion with upper anchorage means connected thereto and adapted to be secured to the roof structure, a forward portion extending downward from the forward end of said intermediate portion and having means on its lower end adapted to be releasably connected to the seat belt, and a rearward portion extending downward from the rearward end of said intermediate portion in spaced relationship to said forward portion and defining therewith an occupant safety chamber, lower anchorage means adapted to be secured to the floor structure, and tension means secured to and extending between the lower end of said rearward portion and said lower anchorage means.

2. An occupant safety retaining device, according to claim 1, wherein said shield is of inverted approximately U-shaped configuration.

3. An occupant safety retaining device, according to claim 1, wherein said forward lower end means comprises a loop element secured to said lower end of said forward portion.

4. An occupant safety retaining device, according to claim 1, wherein said forward portion has ventilation openings extending therethrough.

5. An occupant safety retaining device, according to claim 1, wherein said upper anchorage means comprises a roof anchor bracket having roof fastener-receiving portions thereon.

6. An occupant safety retaining device, according to claim 1, wherein said lower anchorage means consists of the seat belt anchorages.

7. An occupant safety retaining device, according to claim 1, wherein said tension means comprises strap members having their upper ends secured to said rearward shield portions and having their lower ends secured to said lower anchorage means.

* * * * *